(12) United States Patent
Ahmed et al.

(10) Patent No.: US 7,716,009 B2
(45) Date of Patent: May 11, 2010

(54) METROLOGY TOOL RECIPE VALIDATOR USING BEST KNOWN METHODS

(75) Inventors: Ejaj Ahmed, Chicago, IL (US); Charles N. Archie, Granite Springs, NY (US); Stephen W. Goodrich, South Burlington, VT (US); Eric P. Solecky, Hyde Park, NY (US); Georgios A. Vakas, Poughkeepsie, NY (US); Erwin E. Weissmann, Southbury, CT (US); Lin Zhou, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 11/936,971

(22) Filed: Nov. 8, 2007

(65) Prior Publication Data

US 2008/0065696 A1      Mar. 13, 2008

Related U.S. Application Data

(63) Continuation of application No. 11/307,640, filed on Feb. 15, 2006, now Pat. No. 7,305,320.

(51) Int. Cl.
   *G01B 7/00* (2006.01)
   *G01R 31/26* (2006.01)

(52) U.S. Cl. .................................. 702/155; 438/14

(58) Field of Classification Search ................ 702/155, 702/127, 170, 182, 85, 158; 700/108, 117, 700/121, 95, 109; 356/625, 630, 629, 635, 356/636; 707/100–102, 104.1, E17.001, 707/1, 3, 4; 438/5–7, 14, 16; 716/4, 19
See application file for complete search history.

(56) References Cited

U.S. PATENT DOCUMENTS 5,835,227 A    11/1998    Grodnensky et al.

(Continued)

FOREIGN PATENT DOCUMENTS

WO     WO2004059247     7/2004

OTHER PUBLICATIONS

Davis et al., Automatic Synthesis of Equipment Recipes from Specified Wafer-State Transitions, 1997 IEEE, pp. 62-65.*

(Continued)

*Primary Examiner*—Michael P. Nghiem
*Assistant Examiner*—Toan M Le
(74) *Attorney, Agent, or Firm*—DeLio & Peterson, LLC; Peter W. Peterson

(57) ABSTRACT

A method of preparing recipes of operating a metrology tool, wherein each recipe includes a set of instructions for measuring at least one dimension in a microelectronic feature. There is provided a desired recipe having instructions for measuring one or more desired dimensions, the desired recipe or portion thereof including a summary of parameters relating to metrology tool function with respect to the microelectronic feature dimension to be measured. The method includes comparing the instructions in the desired recipe with the instructions in a database, identifying differences between the instructions in the desired recipe and the instructions in the database, modifying the instructions in the desired recipe to conform to the instructions in the database, verifying the desired recipe prior to using the modified desired recipe by the metrology tool, and using the desired recipe to execute a microelectronic feature measurement on the metrology tool.

12 Claims, 4 Drawing Sheets

U.S. PATENT DOCUMENTS

| | | | |
|---|---|---|---|
| 6,041,270 | A | 3/2000 | Steffan et al. |
| 6,055,045 | A | 4/2000 | Weill et al. |
| 6,268,227 | B1 | 7/2001 | Toprac |
| 6,345,211 | B1 | 2/2002 | Yu |
| 6,388,253 | B1 | 5/2002 | Su |
| 6,415,193 | B1 | 7/2002 | Betawar et al. |
| 6,430,572 | B1 | 8/2002 | Steffan et al. |
| 6,432,760 | B1 | 8/2002 | Kothandaraman et al. |
| 6,535,774 | B1 | 3/2003 | Bode et al. |
| 6,587,744 | B1 | 7/2003 | Stoddard et al. |
| 6,625,513 | B1 | 9/2003 | Lymberopoulos et al. |
| 6,650,958 | B1 | 11/2003 | Balazs et al. |
| 6,665,575 | B2 * | 12/2003 | Betawar et al. ............. 700/121 |
| 6,694,210 | B1 | 2/2004 | Toh |
| 6,708,074 | B1 | 3/2004 | Chi et al. |
| 6,735,493 | B1 | 5/2004 | Chou et al. |
| 6,756,164 | B2 | 6/2004 | Franke et al. |
| 6,804,014 | B1 | 10/2004 | Markle et al. |
| 6,808,942 | B1 | 10/2004 | Patel et al. |
| 6,829,056 | B1 | 12/2004 | Barnes et al. |
| 6,834,370 | B1 | 12/2004 | Brandl et al. |
| 6,836,691 | B1 | 12/2004 | Stirton |
| 6,858,361 | B2 | 2/2005 | Mui et al. |
| 6,968,245 | B2 | 11/2005 | Hsu et al. |
| 6,978,189 | B1 | 12/2005 | Bode et al. |
| 7,047,101 | B1 | 5/2006 | Young et al. |
| 7,052,919 | B2 | 5/2006 | Oh |
| 7,076,321 | B2 | 7/2006 | Purdy |
| 7,096,086 | B2 | 8/2006 | Sato |
| 7,283,882 | B1 * | 10/2007 | Bransky et al. ............... 700/96 |
| 2002/0177245 | A1 | 11/2002 | Sonderman et al. |
| 2002/0193902 | A1 | 12/2002 | Shanmugasundram et al. |
| 2004/0078107 | A1 | 4/2004 | Chou et al. |
| 2004/0203321 | A1 | 10/2004 | Tsuchiyama et al. |
| 2004/0220968 | A1 * | 11/2004 | Hellig et al. ............. 707/104.1 |
| 2005/0053846 | A1 | 3/2005 | Shin et al. |
| 2005/0143853 | A1 | 6/2005 | Akimori et al. |
| 2006/0247818 | A1 * | 11/2006 | Hasan ........................ 700/121 |
| 2007/0156275 | A1 * | 7/2007 | Piper et al. .................. 700/121 |

OTHER PUBLICATIONS

Chain et al., "In-line Electrical Probe for CD Metrology Below 0.5 Micrometer," 1995 IEEE, pp. 76-80.

Imai et al., "Development of Equipment-Installed APC System and Critical Dimension Control Technology of Gate-Hard-Mask Etching Using its System," 2005 IEEE, pp. 139-142.

W. Banke and C. Archie, "Characteristics of Accuracy for CD Metrology," Metrology, Inspection, and Process Control for Microlithography XII, B. Singh, editor, Proceedings of SPIE, vol. 3677, 18 pages.

* cited by examiner

US 7,716,009 B2

METROLOGY TOOL RECIPE VALIDATOR USING BEST KNOWN METHODS

This is a continuation of application Ser. No. 11/307,640 filed on Feb. 15, 2006, now U.S. Pat. No. 7,305,320.

BACKGROUND OF THE INVENTION

The present invention relates to the manufacture of semiconductor devices and, in particular, to the management and quality control of recipes, which comprise tool control instructions and parameters in a metrology tool used to measure dimensions in microelectronic features.

DESCRIPTION OF RELATED ART

During microelectronics manufacturing, a semiconductor wafer is processed through a series of tools that perform lithographic processing to form features and devices that form the microelectronic circuits and other features on the substrate of the wafer. Lithographic systems replicate circuit patterns by projecting the image of a mask pattern onto a wafer, and consist of imaging tools that expose patterns and processing tools that coat, bake and develop the substrates. The pattern may consist of features of varying size and density, all of which must be printed simultaneously with dimensional fidelity to design. As used herein, the term critical dimension (CD) or critical width refers to the smallest dimension of a pattern or feature that can be produced by the lithographic system. Such processing has a broad range of industrial applications, including the manufacture of semiconductors, flat-panel displays, micromachines, and disk heads.

Generally after each process step, any errors on the wafer are measured and controlled using metrology tools that image dimensions either on portions of the microelectronic circuits themselves or on specialized targets printed on the wafer. Such circuit portions, targets, and other features shall be generally referred to as microelectronic features, unless otherwise specified. The metrology tools use so-called recipes to make measurements of desired microelectronic features. Such recipes generally comprise maps of the microelectronic features and commands to the tools optical measurement systems to align the particular feature to be measured with the tool measurement device, by rotation and translation of the wafer with respect to the tool, and to use the required tool measurement device. A typical tool measurement device may use purely optical schemes to obtain the respective measurements; examples of these types of tools include overlay, scatterometry and film thickness. Other tool measurement devices include an optical device in conjunction with a scanning electron, atomic force microscopy or some other combination where each tool measurement device is designed to measure specific process steps along the way during chip fabrication. From this point forward measuring a desired dimension of a microelectronic feature can mean measuring critical dimensions, overlay, film thickness, depth and the like.

As metrology tools become more and more advanced, they require more skill on the part of the user. Because a high level of expertise is needed to create a robust recipe, many chip fabricators do not have sufficient manpower to allow all of these thousands of recipes to be created as robustly as needed. In many cases the recipes created do not run robustly. A typical CD recipe may have the following categories captured as failures in the error log: Optic GA (global alignment); Optic PR (pattern recognition); SEM (scanning electron microscope) GA; SEM PR; Measurement; Manual Measurement; and Others. Over time these errors become a significant issue that directly affects the cycle time needed to build a fully functioning chip; in some extreme cases it affects yield. Since it could take a year or more to master programming recipes on some metrology tools, poorly written metrology recipes create major problems in metrology tool management, cycle time and process debug.

Recipe management and construction of quality measurement recipes for metrology tools, in general, is a difficult task. Many factors work against the metrology engineer, such as increasing complexity of the metrology tools, numerous recipes to create and manage (typically, many thousands) and a staff of recipe writers with limited and differing levels of experience. Further, it is difficult to keep the entire staff at the same level with respect to recipe writing standards for each unique situation because the knowledge required for all the various parameters that affect the measurements takes a long time to learn and is difficult to teach. One example is recipe management on the critical dimension scanning electron microscope (CD SEM) measurement tools. A particular chip manufactured using a 65 nm process may pass through the CD SEMs about 70 times. This means 70 unique recipes are created on the CD SEM measuring the process at various steps, and each unique chip using the 65 nm process requires its own unique set of 70 recipes. For example, if there are 30 unique chips using the 65 nm process, 70×30=2100 unique recipes need to be created. Further, each of these recipes within a process node (e.g., 65 nm) has it own unique set of measurement requirements; some process steps may need to measure a space width, some a line width, some contact holes, among others and even combinations of these. These same concepts and methodologies apply to other metrology or process tools.

For a given recipe there are numerous choices to make that affect the measurement quality and therefore the ability to control the process. Examples of some possible choices on a CD SEM recipe are probe current, accelerating voltage, charge management schemes, measurement algorithms, scanning strategies, waveform processing, and the like. It is difficult to teach what combinations of parameters to use for each situation and how to manage intra-technology trends.

Prior art approaches to recipe management and quality control are typically handled with training of recipe writers and creation of basic guidelines for recipe writing and rewrites of recipes after they are identified as ineffective. Training generally covers basic techniques and parameters choices for common situations. Since production is the first priority for tool time, expert resources are costly and in short supply so that advanced tool features are used only by experts when necessary, and taught to recipe writers on sporadic basis. This approach leaves personnel at different levels of skill and ineffective guidelines causing recipes to be written with different degrees of optimization.

Previous recipes have been used as templates for new recipes. While this approach encourages consistency, it does not address the possibility of using a poorly running recipe to create a second poorly running recipe. It also doesn't address the problem a recipe writer has of which recipe to base the new recipe on, since hundreds of recipes may exist for each process step for many technologies and sub technologies. This complexity leads confusion and inappropriately chosen reference recipes.

More recent prior art recipe-improvement methods address only the recipe management aspect of the problem. Some of these use various methods of determining poorly running recipes. Among these methods are checking error logs for recipes failing pattern recognition, measurement acquisition or other tool related cause and reworking of recipes whose measurements fail to meet specification. U.S. patent application Ser. No. 11/160,404, the disclosure of which is hereby incorporated by reference, is directed to a method for identifying failures in a metrology tool system having an error log for recipe failures. The method determines normalized number of recipes errors the error log, identifies recipes having the greatest normalized number of errors, and identifies the most error-prone recipes in the list of jobs to be performed by the metrology tools.

Using the same example from above, it would be advantageous to create a 65 nm process gate develop CD SEM recipe on one unique product (e.g., a unique chip) similar to another product (e.g., a different unique chip) that utilizes the same 65 nm, process, for purposes of consistency. This will insure that measurements reported out at gate develop CD are not influenced by both recipes having differing parameter sets. Given the aforementioned problems, what is needed is a method and system that allows many individuals with limited experience to create recipes that run well, maintain consistency among recipes when appropriate and generate quality measurements.

SUMMARY OF THE INVENTION

Bearing in mind the problems and deficiencies of the prior art, it is therefore an object of the present invention to provide an improved method of preparing and verifying recipes for operating a metrology tool used to measure desired dimensions in microelectronic features.

It is another object of the present invention to provide a method of preparing recipes for operating a metrology tool that assists metrology tool engineers of varying degrees of skill.

A further object of the invention is to provide an automated method of preparing metrology tool recipes that does not rely on use of templates from poorly running or untested recipes.

It is yet another object of the present invention to provide a method of preparing metrology tool recipes that permits metrology tool engineers with limited experience to create recipes that run well and generate quality measurements.

Still other objects and advantages of the invention will in part be obvious and will in part be apparent from the specification.

The above and other objects, which will be apparent to those skilled in the art, are achieved in the present invention which is directed to a method of preparing recipes for operating a metrology tool used to measure desired dimensions in microelectronic features, wherein each recipe comprises a set of instructions for measuring at least one dimension in a microelectronic feature. The method comprises providing a database including a plurality of known instructions for measuring different dimensions in a microelectronic feature and providing a desired recipe or portion thereof having instructions for measuring one or more desired dimensions in a microelectronic feature. The method includes comparing the instructions in the desired recipe with the instructions in the database prior to using the recipe by the metrology tool, identifying differences between the instructions in the desired recipe and the instructions in the database, and modifying the instructions in the desired recipe to conform to the instructions in the database. The modified desired recipe is then used by the metrology tool; and used to execute a microelectronic feature measurement on the metrology tool.

The database having the plurality of known instructions preferably comprises best known methods for measuring different dimensions in a microelectronic feature. The database may be generated from recipes used by the metrology tool, and may further include access to reference images of metrology tool setup conditions.

Preferably, the desired recipe includes a summary of parameters relating to metrology tool function with respect to the microelectronic feature dimension to be measured. The parameters may include critical dimensions, overlay, film thickness, depth and other required measurements. More preferably, the method further includes creating the database having the plurality of known instructions for measuring different dimensions in a microelectronic feature by providing an initial recipe, creating a summary of the initial recipe, and adding to the summary categorization attributes to identify the recipe summary for retrieval from the database.

The known instructions from the database may be provided based on identification of the parameters of the desired recipe prior to writing the desired recipe, or based on identification of the parameters of the desired recipe prior to verification or the desired recipe either manually or automatically.

The method may further include, after modifying the instructions in the desired recipe to conform to the instructions in the database, completing the desired recipe and again comparing the instructions in the completed desired recipe with the instructions in the database, identifying differences between the instructions in the completed desired recipe and the instructions in the database; and optionally modifying the instructions in the completed desired recipe to conform to the instructions in the database prior to using the recipe at the metrology tool.

The comparison of the instructions in the desired recipe with the instructions in the database may be made during creation of the desired recipe, prior to completing the recipe. The method may further include, prior to using the modified desired recipe to the metrology tool, locking the modified desired recipe to prevent further modification.

The method may include updating the database with new best know methods for measuring different dimensions in a microelectronic feature. The method may then further include comparing the instructions in the desired recipe with the instructions in the updated database; identifying differences between the instructions in the desired recipe and the instructions in the updated database; modifying the instructions in the desired recipe to conform to the instructions in the updated database; using the modified desired recipe to the metrology tool; and using the desired recipe to execute a microelectronic feature measurement on the metrology tool.

The recipe for measuring a feature may be created using that feature on a wafer, or may be created without using a feature on a wafer.

In another aspect, the present invention may be used to prepare such recipes for operating the metrology without using the aforementioned database. In such case, the instructions in the desired recipe are compared with the instructions in a existing recipe or portion thereof including a summary of parameters relating to metrology tool function with respect to the microelectronic feature dimension to be measured, with the parameters being selected from the group consisting of critical dimensions, overlay, film thickness, depth and other required measurements for the same technology and or process prior to using the recipe by the metrology tool. The method then comprises identifying differences between the instructions in the desired recipe and the instructions in the existing recipe for the same technology and or process, modifying the instructions in the desired recipe to conform to the instructions in the existing recipe for the same technology and or process, using the modified desired recipe by the metrology tool, and using the desired recipe to execute a microelectronic feature measurement on the metrology tool.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-4 of the drawings in which like numerals refer to like features of the invention.

Figure 1:
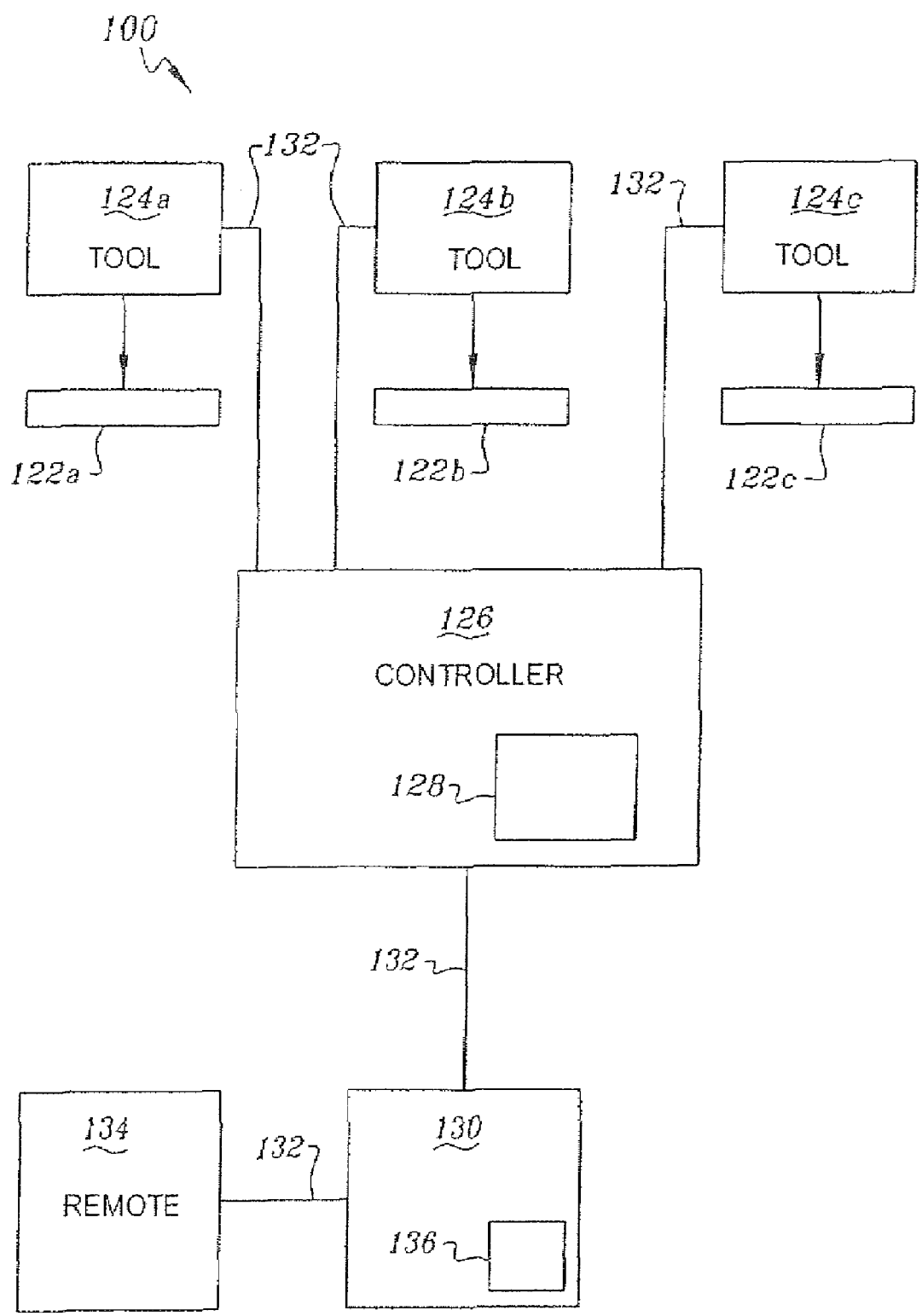
FIG. 1 is a schematic of the metrology tool system capable of practicing the method of the present invention.

The metrology tool system used to measure desired dimensions in microelectronic features may comprise a single metrology tool or a plurality of metrology tools connected by a network, such as a local area network (LAN) or even the Internet. As shown in FIG. 1, metrology tool system 100 comprises metrology tools 124a, 124b, 124c connected by network 132 to controller 126, which contains microprocessor 128 and has access to program/data storage device 130. Recipes and recipe-related information to be used by the metrology tools in making the microelectronic feature measurements are stored in database 136 located in program/data storage device 130. Tools 124a, 124b, 124c run individual recipes from database 136, as directed by the microprocessor of controller 126, to make measurements of one or more dimensions of microelectronic features on wafers 122a, 122b, 122c, respectively. A remote computer 134 may access and download the database or other information on storage device 130 for immediate or future analysis.

The preferred method of preparing recipes for operating a metrology tool used to measure desired dimensions in microelectronic features initially evaluates the number of recipes that need to be prepared or constructed. Table 1 illustrates an example, for 90 nm process, of the hierarchy of technology, sub technology and products that translates into the number of recipes needing to be created and therefore managed for measurement robustness and quality:

TABLE 1

| Technology: | 90 nm | | | | | |
| --- | --- | --- | --- | --- | --- | --- |
| Sub-Technology: | 90 nm SOI Product | 90 nm Bulk Product | 90 nm EDRAM Product | 90 nm Memory Product | 90 nm Shrink Product | 90 nm Shrink 2 Product |
| | 1 | 11 | 19 | 31 | 36 | 46 |
| | 2 | 12 | 20 | 32 | 37 | 47 |
| | 3 | 13 | 21 | 33 | 38 | 48 |
| | 4 | 14 | 22 | 34 | 39 | 49 |
| | 5 | 15 | 23 | 35 | 40 | 50 |
| | 6 | 16 | 24 | | 41 | |
| | 7 | 17 | 25 | | 42 | |
| | 8 | 18 | 26 | | 43 | |
| | 9 | | 27 | | 45 | |
| | 10 | | 28 | | | |
| | | | 29 | | | |
| | | | 30 | | | |

Each product may be viewed as a unique chip being created using some version of the 90 nm process. Each chip within the same technology and sub-technology has a different physical size that causes unique recipes to be needed for different chips, even if they use the same process. Each product listed in the table requires a unique set of recipes, on the order of between about 40-90 recipes, depending on the complexity of the core technology.

To simplify management of these recipes, the process begins by generalizing the approach to writing measurement recipe within a given technology and sub-technology and product category. Table 2 illustrates how a desired product X requires various process steps to measured as process step 1 through process step Y.

TABLE 2

| Product X |
| --- |
| Process Step 1 |
| Process Step 2 |
| . |
| . |
| Process Step Y |

Process steps 1 . . . Y represent all the process steps requiring unique measurement recipes. Portions of information in the measurement recipe created for process step 1 for a given Product A can be fed forward to a measurement recipe being created for process step 1 for Product B if they are in the same technology and sub-technology category. The portions of information being fed forward should be certified as optimal at that point in time. By having known experts writing, optimizing and documenting all the recipes and key recipe parameters for a core product, parameters in the recipe are insured as being optimal.

A summary of the recipe information is then prepared, and is identified as a best known method (BKM). Each BKM becomes a building block of critical information to forward for recipes being created to monitor the same process step in a different product for the same technology or across technologies if deemed appropriate. This now permits less experienced recipe writers to follow the same approach as was used by the expert by interacting with the BKM summary when they need to write a similar recipe. The less experienced recipe writer uses this BKM to create the recipe with the same set of optimal parameters that were used by the expert. Verification should also be done to insure inadvertent errors were not introduced, to ensure consistency among measurements for the same process step being measured across multiple products. This information can also be used to feedback to correct previously created recipes that at the time did not have the benefit of this BKM information/methodology.

An example of critical information in the BKM for a CD SEM is shown in Table 3.

TABLE 3

| Category | Iprobe | Avgfactor |
|---|---|---|
| NumofTargets | TargetName | Parameter |
| NumofArrays | Repetitions | NumPix |
| AutoRevisit | NumofTargets | PixelSize |
| CoverRadAF | NumofFields | NomFeatureSize |
| DMDCoverRad | Category | NumofContacts |
| Numfields | AFtype | Contact0 |
| Illumination | NumofPattern | Contact1 |
| PatternFOV | MeasTargetOrient | Contact2 |
| UseAFsitesforGA | MeasOption | Contact3 |
| Numfields | Algorithm | NumofLines |
| Exposuretime | FirstFeature | ProfileGrade |
| Vacc | NumofEdges | Tilt |
| Vhar | NumofEdgePairs | TiltAngle |
| Tilt | EdgepairX | FOV |
| TiltAngle | EdgepairY | |
| FOV | NumofLines | |
| Iprobe | DIP | |

Table 3 illustrates a large set of parameters that affect how well the recipe runs and the quality of the recipe measurement. By having an expert determine these optimally, for example, by using the BKM optimizer disclosed in U.S. application Ser. No. 11/307,641, one avoids inconsistency among recipes that should measure similarly and run equally well since they should be sharing this same set of parameters. These parameters have many different functions. For example, some of these parameters affect the measurement such as probe current, exposure time and pixel size and other parameters affect how well the recipe runs like pattern recognition thresholds, pattern recognition magnification (FOV) and beam deflection parameters.

Next, the various BKMs are then loaded into a database, such as database 136 (FIG. 1) with specific categories so the user has the ability to automatically retrieve them, based on descriptive information in the recipe name that is being prepared, and that properly associates it with the correct BKM. One can retrieve the BKM at remote computer 134 before writing the recipe, during the recipe writing and/or after recipe writing. The benefit of checking the BKMs before and during recipe construction is that it eliminates the need to make these many decisions during the recipe construction process for the inexperienced writer. Checking the recipe after construction ensures that no manual mistakes were made after the recipe is completed. Further, incorrect parameters may be highlighted are based on the BKM and corrected automatically before the recipe is released to measure product. Ideally, a BKM should exist in the database for each of the fundamental measurement requirements.

The preferred method and system prepares recipes for measuring microelectronic features in a metrology tool therefore initially creates a database of specifically categorized BKMs, and then and creates a program that reads and/or creates a recipe summary from the metrology tool or server and associates it with a correct BKM in the database to check for compliance. The method and system then creates a program to add reference images of setup conditions including, but not limited to, pattern recognition features and measurement and focus gates, to the categorized database. Images may reside in a separate storage partition that is appropriately linked to the target BKM in the BKM database, thereby effectively making it part of the database. The method and system subsequently creates a comparison between the metrology recipe under test and known BKM in the database, and highlights critical differences between the metrology recipe and known BKM in the database. The method and system makes recommendations or automatically fixes differences between the metrology recipe and BKM database, and approves the new recipe before it can run product. Previously created recipes may also be fixed where appropriate and sent back to the metrology tool or server. The approved new recipe may be either locked from changes or always checked in the future against the BKM prior to it being used.

Figure 2:
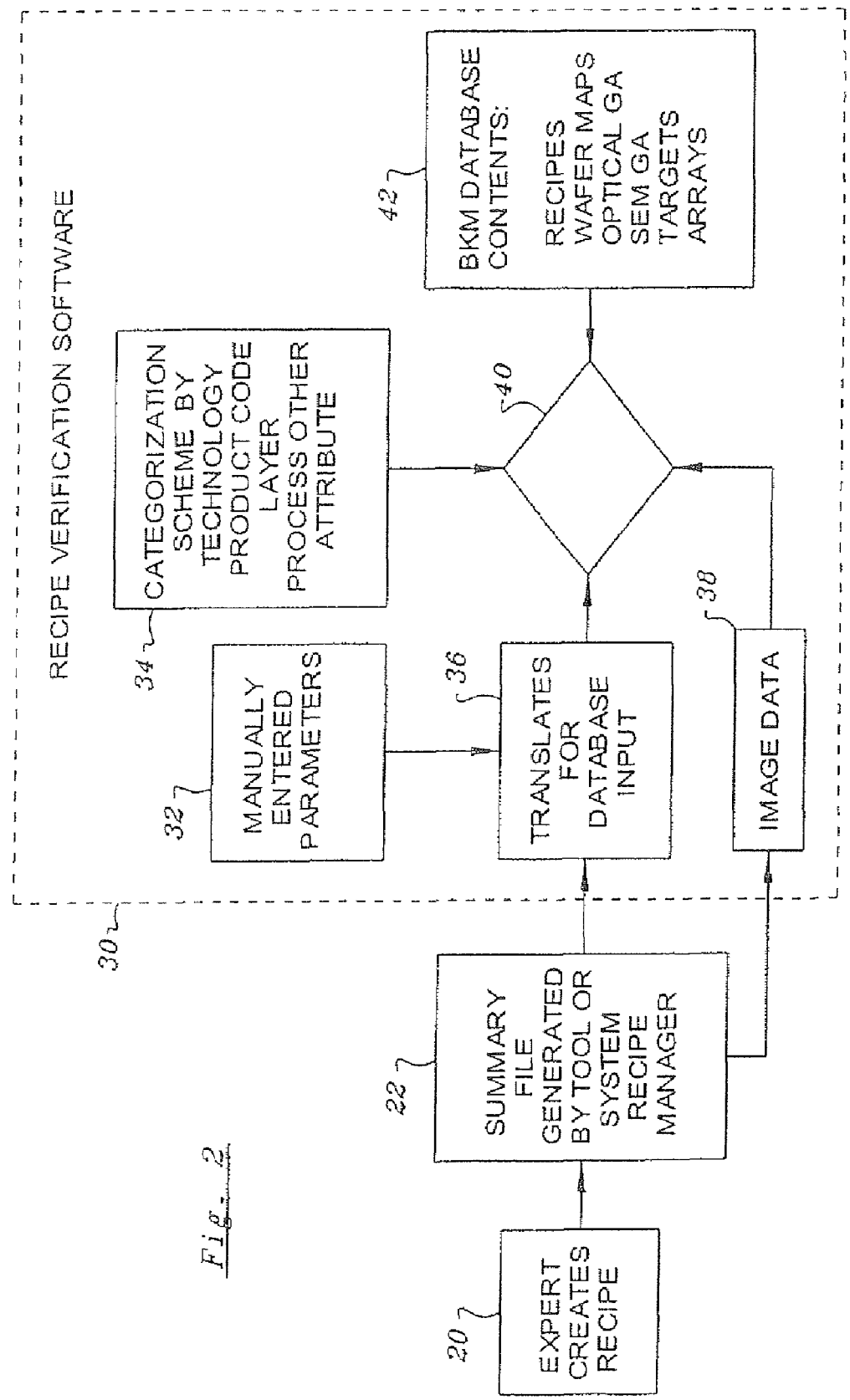
FIG. 2 is a flowchart showing the preferred general method of creating the best known methods (BKMs) used to preparing recipes for operating a metrology tool in accordance with the present invention.
Figure 3:
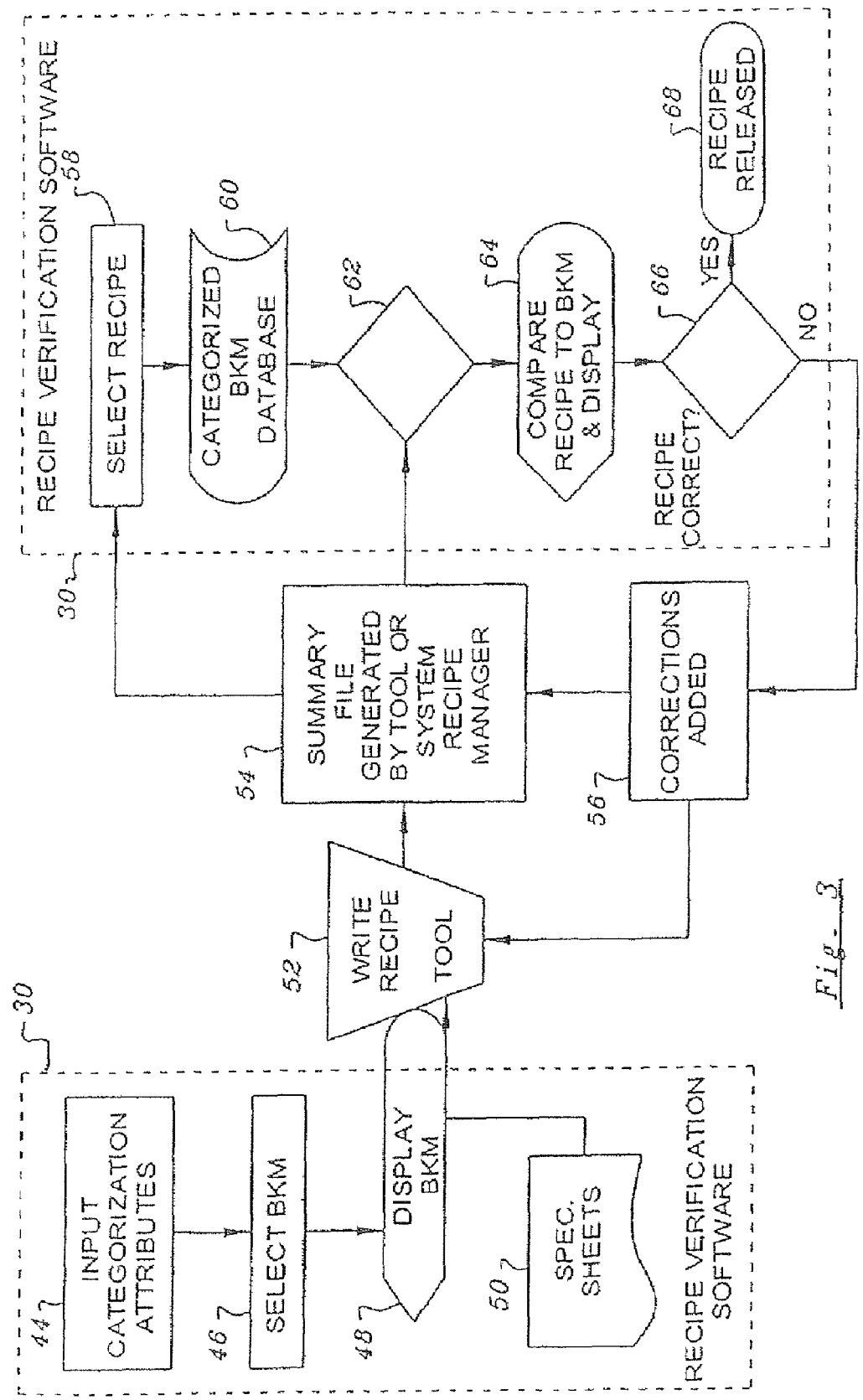
FIG. 3 is a flowchart showing the preferred method of creating and verifying recipes using the BKMs described in FIG. 2.
Figure 4:
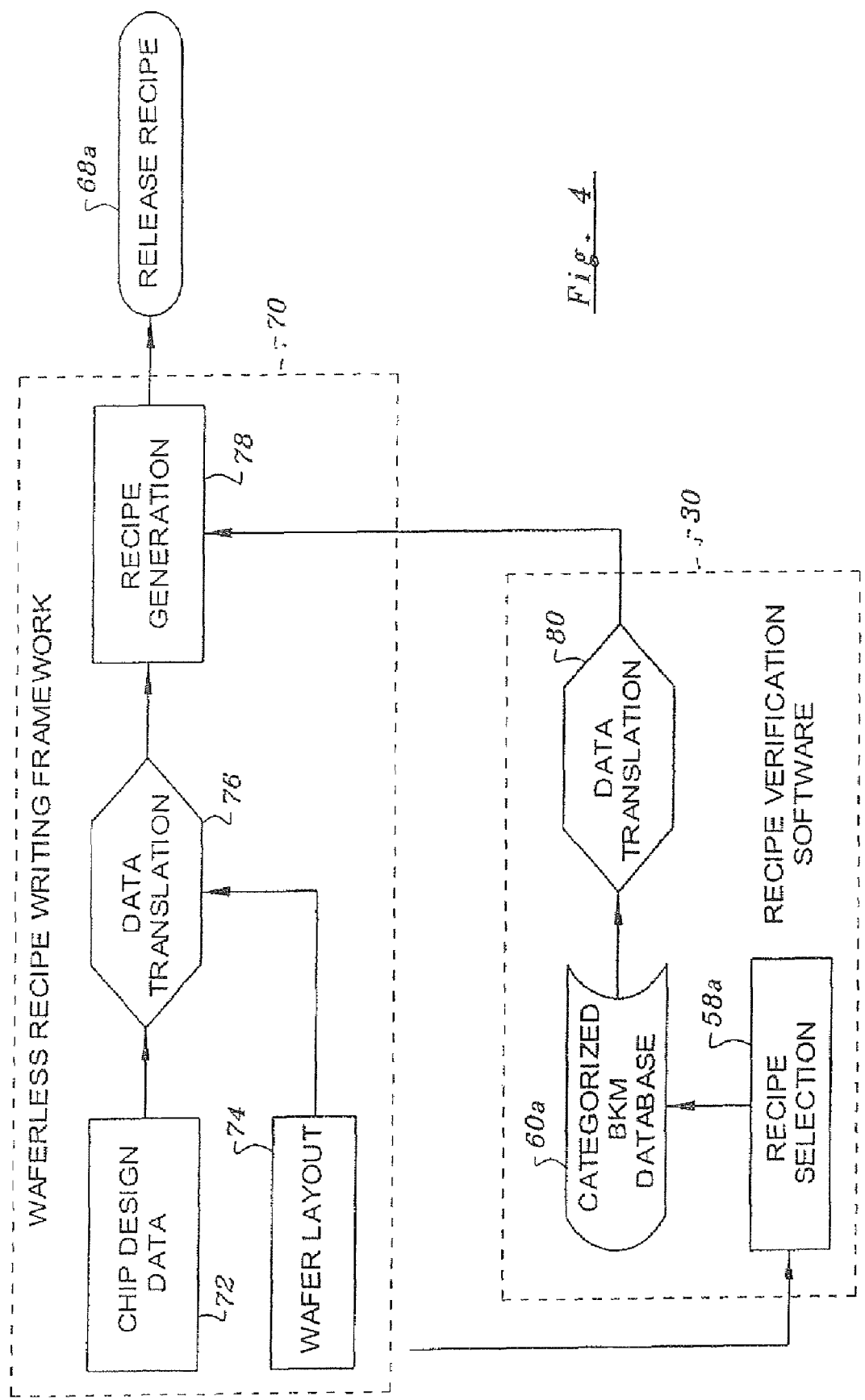
FIG. 4 is a flowchart showing the preferred method of using the BKMs described in FIG. 2 in conjunction with a waferless recipe creation environment.

The preferred method and system of preparing recipes for operating a metrology tool used to measure desired dimensions in microelectronic features is shown in FIGS. 2-4. FIG. 2 describes the content and method for creation of the database containing the recipe parameters, tool setup conditions and appended categorization attributes, and other parameters needed to create the BKMs. In one method of creating the BKMs, an expert creates the recipe 20 at a remote computer 134 connected to the metrology tool system 100 (see FIG. 1), which includes a recipe writing system provided by the tool manufacturer. A summary file 22 is generated by a program on the tool or recipe writing system (the latter being either pre-existing or created for this purpose), which interprets the recipe, extracting the recipe parameters contained in the recipe for which input is requested or provided by the recipe writer during the creation of the recipe. The extracted parameters are put in a summary file containing the predetermined identities for the parameters and the parameter values. The summary file also may contain header or comment information identifying or grouping the parameters by function. A recipe verification program 30 is provided, which may reside in the tool or tool recipe storage 130 or other server accessible to the recipe writer and tool/recipe system, or on an Internet web page. The recipe verification program translates 36 recipe data from summary file 22 and then adds 40 categorization attributes 34 to the translation and stores the combined information in a database 42. These categorization attributes include identifiers that permit the BKM to be retrieved in accordance with the type of technology used, the product code, layer, type of process or other attribute of interest. Any type of database may be employed since software may be written to control the specific database configuration used, for example, DB2 and MYSQL, or may contain drivers enabling the use of several database configurations. In another method, BKM's may be created manually 32 without the use of tools by entering parameters and tool information directly in the verification software 30. In either BKM creation method, image data 38 may be added and linked to a BKM in the database either manually though the software or automatically from Tool/recipe system.

FIG. 3 describes the content and method to create and verify recipes using the BKM database described in FIG. 2. A recipe writer of any experience level may use the recipe verification program 30 by inputting the recipe identification 44 which includes the desired categorization attributes. The program 30 selects the proper BKM 46 using the categorization attributes and makes the appropriate BKM available on a system display 48. The categorization parameters are displayed in a manner consistent with the degree of importance of the parameter, such as by highlighting by color or other means various degrees of importance. For example, the color red may indicate critical parameters and the color yellow may indicate other parameters that fall into a range of value. Images of tool setups and targets may additionally be provided. Other auxiliary information not contained in the BKM, such as specification sheets 50 and location of features, may also be provided. (In the case of waferless recipe writing, discussed below, these will largely be obsolete.) The information from the display 48 and spec sheets 50 is then used at the metrology or recipe writing system 52. A summary file 54 is generated by the tool/recipe system, and contains the extracted recipe parameters contained in the recipe for which input is requested from or provided by the recipe writer during the creation of the recipe and header or comment information Identifying or grouping the parameters by function. The recipe verification program may automatically receive the summary or may manually be instructed to retrieve 58 the summary file for the desired recipe. The recipe attributes trigger the program 30 to select the proper BKM 60 from the categorized BKM database and compare the recipe and BKM and display 64 the parameters, critical parameters, mismatches or other parameter subset, using highlighting techniques described in the description of FIG. 2. After comparison 66, if the recipe is incorrect the corrections 56 are made by the recipe writer on the tool/recipe system 52 or automatically sent to tool/recipe system 54 and applied. If the recipe matches the BKM the recipe is released 68. In this latter case, the fabrication tool management system is notified of the release and makes recipe available to be utilized for production using prior art methods. The approved recipe is then either locked or always checked against the BKM before it used in production, to prevent unapproved changes.

The BKM database may also be used for waferless recipe writing systems. Typically, when writing metrology recipes one needs information regarding the wafer (on which the microelectronic features are to be lithographically produced) at the given process step to create the recipe. Previously, attempts to provide metrology tool recipes without the wafer information have had limitations in assigning the appropriate parameters to place in the given recipe being created. The categorized BKM database can also supplement these recipes with the best set of parameters to use in the recipes, in both a feed forward and feedback mode.

FIG. 4 depicts how the present invention may be used in conjunction with the waferless recipe creation environment. The basic framework of waferless recipe writing 70 is described by utilizing semiconductor chip design data 72 and wafer layout data 74 to provide physical coordinates, feature size and location for all applicable layers of a semiconductor chip design. The data is translated 76 for compatibility to a specific tool set in use. To verify that the created recipes meet predetermined recipe BKM standards, the recipe verification program can provide this information from the categorized database 60a. The waferless recipe writing environment will provide a recipe identification or selection 58a to the program. This may additionally be inputted manually. The recipe verification program 30 selects the appropriate BKM in the database 60a which is translated 80 for the waferless recipe creation environment and transferred to that environment 70 where the recipe generation software 78 combines it with the translated design data to generate the recipe 68a. The completed recipe 68a can then be reintroduced to the verification software at block 58 in FIG. 3 to complete verification by the steps of database BKM selection 60, comparison 64 and decision 66. Corrections can be applied at 56 or the recipe may be released if it is correct 68.

The present invention can take the form of an entirely hardware embodiment, e.g., the database of the metrology tool system, an entirely software embodiment or an embodiment containing both hardware and software elements. In a preferred embodiment, the overall method of the present invention described above, as well as the recipe verification software, is implemented in software, which includes but is not limited to firmware, resident software, microcode, or other computer usable program code.

Furthermore, the invention can take the form of a computer program product accessible from a computer-usable or computer-readable medium providing program code, such as database 136, for use by or in connection with a computer or any instruction execution system, such as controller 126 and microprocessor 128, as shown in FIG. 1. For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared or semiconductor system (or apparatus or device) or a propagation medium. Examples of computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor, such as microprocessor 128, coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/Output or I/O devices of the metrology tools and system controller (including but not limited to keyboards, displays, pointing devices, etc.) can be coupled to the system either directly or through intervening I/O controllers.

Network adapters may also be coupled to the system network 132 to enable the data processing system to become coupled to other data processing systems or remote printers or storage devices through intervening private or public networks. Modems, cable modem and Ethernet cards are just a few of the currently available types of network adapters. Preferably, the program embodying the method of the present invention permits remote analysis of recipes, allows analysis of previously downloaded recipes and BKMs, and connects to the database of recipes to allow probing of historical data regarding recipe and non-recipe based metrology tool failures. In the analysis of recipes and BKMs, the data may be downloaded to a remote computer 134 for immediate or future analysis and recipe writing.

Thus, the present invention provides an improved method of preparing recipes for operating a metrology tool used to measure desired dimensions in microelectronic features that assists metrology tool engineers of varying degrees of skill. The invention provides an automated method of preparing metrology tool recipes that does not rely on use of templates from poorly running or untested recipes, and permits metrology tool engineers with limited experience to create recipes that run well and generate quality measurements.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A computer program product comprising:
   a computer usable medium having computer readable program codes embodied in said medium for preparing recipes for operating a metrology tool used to measure desired dimensions in microelectronic features, each recipe comprising a set of instructions for measuring at least one dimension in a microelectronic feature, the computer program product utilizing a database having a plurality of known instructions for measuring different dimensions in a microelectronic feature, said computer program product having:
   computer readable program codes for comparing the instructions in the database with instructions in a desired recipe or portion thereof for measuring one or more desired dimensions in a microelectronic feature;
   computer readable program codes for identifying differences between the instructions in the desired recipe and the instructions in the database;
   computer readable program codes for modifying the instructions in the desired recipe to conform to the instructions in the database; and
   computer readable program codes for releasing the modified desired recipe for use by the metrology tool to execute a microelectronic feature measurement.

2. The computer program product of claim 1 further including computer readable program codes for generating the database having the plurality of known instructions for measuring different dimensions in a microelectronic feature from recipes used by the metrology tool.

3. The computer program product of claim 1 further including computer readable program codes for creating a summary of parameters relating to metrology tool function with respect to the microelectronic feature dimension to be measured.

4. The computer program product of claim 3 wherein the parameters relating to metrology tool function with respect to the microelectronic feature dimension to be measured are selected from the group consisting of critical dimensions, overlay, film thickness, depth and other required measurements.

5. The computer program product of claim 1 further including computer readable program codes for generating the database having the plurality of known instructions for measuring different dimensions in a microelectronic feature, the database including reference images of metrology tool setup conditions.

6. The computer program product of claim 1 further including computer readable program codes for creating the database having the plurality of known instructions for measuring different dimensions in a microelectronic feature by providing an initial recipe, creating a summary of the initial recipe, and adding to the summary categorization attributes to identify the recipe summary for retrieval from the database.

7. The computer program product of claim 1 wherein computer readable program codes for comparing the instructions in the desired recipe with the instructions in the database does so prior to completing the recipe.

8. The computer program product of claim 7 further computer readable program codes for further comparing the instructions in the completed desired recipe with the instructions in the database, identifying differences between the instructions in the completed desired recipe and the instructions in the database; and optionally modifying the instructions in the completed desired recipe to conform to the instructions in the database prior to releasing the recipe for use by the metrology tool.

9. The computer program product of claim 1 wherein the database having the plurality of known instructions comprises best known methods for measuring different dimensions in a microelectronic feature.

10. The computer program product of claim 9 further including computer readable program codes for updating the database with currently amended best known methods for measuring different dimensions in a microelectronic feature.

11. The computer program product of claim 10 further including computer readable program codes for comparing the instructions in the desired recipe with the instructions in the updated database; identifying differences between the instructions in the desired recipe and the instructions in the updated database; modifying the instructions in the desired recipe to conform to the instructions in the updated database prior to releasing the recipe for use by the metrology tool.

12. A computer program product comprising:
   a computer usable medium having computer readable program codes embodied in said medium for preparing recipes for operating a metrology tool used to measure desired dimensions in microelectronic features, each recipe comprising a set of instructions for measuring at least one dimension in a microelectronic feature, the computer program product utilizing a database having a plurality of known instructions for measuring different dimensions in a microelectronic feature, said computer program product having:
   computer readable program codes for comparing the instructions in the database with instructions in a desired recipe or portion thereof for measuring one or more desired dimensions in a microelectronic feature;
   computer readable program codes for identifying differences between the instructions in the desired recipe and the instructions in the database;
   computer readable program codes for modifying the instructions in the desired recipe to conform to the instructions in the database;
   computer readable program codes for releasing the modified desired recipe for use by the metrology tool to execute a microelectronic feature measurement; and
   computer readable program codes for locking the modified desired recipe to prevent further modification.

* * * * *